(12) United States Patent
Versteyhe et al.

(10) Patent No.: US 10,088,022 B2
(45) Date of Patent: Oct. 2, 2018

(54) TORQUE PEAK DETECTION AND CONTROL MECHANISM FOR A CVP

(71) Applicant: Dana Limited, Maumee, OH (US)

(72) Inventors: Mark R. J. Versteyhe, Oostkamp (BE); Stijn Goossens, Erpe-Mere (BE)

(73) Assignee: Dana Limited, Maumee, OH (US)

( * ) Notice: Subject to any disclaimer, the term of this patent is extended or adjusted under 35 U.S.C. 154(b) by 238 days.

(21) Appl. No.: 15/036,557

(22) PCT Filed: Nov. 17, 2014

(86) PCT No.: PCT/US2014/065909
§ 371 (c)(1),
(2) Date: May 13, 2016

(87) PCT Pub. No.: WO2015/073948
PCT Pub. Date: May 21, 2015

(65) Prior Publication Data
US 2016/0298737 A1 Oct. 13, 2016

Related U.S. Application Data

(60) Provisional application No. 61/905,742, filed on Nov. 18, 2013.

(51) Int. Cl.
F16H 15/52 (2006.01)
F16H 15/28 (2006.01)
F16H 61/664 (2006.01)

(52) U.S. Cl.
CPC ............. *F16H 15/52* (2013.01); *F16H 15/28* (2013.01); *F16H 61/6647* (2013.01); *F16H 61/6649* (2013.01)

(58) Field of Classification Search
CPC .. F16H 15/52; F16H 61/6647; F16H 61/6649; F16H 15/28
See application file for complete search history.

(56) References Cited

U.S. PATENT DOCUMENTS

| 1,063,244 A | 6/1913 | Ludwig |
| 1,215,969 A | 2/1917 | Thomas |
| 1,526,140 A | 2/1925 | Gruver |
| 2,019,006 A | 10/1935 | Ferrarl |
| 2,060,884 A | 11/1936 | Madle |

(Continued)

FOREIGN PATENT DOCUMENTS

| AU | 2011224083 A1 | 10/2011 |
| CN | 101392825 A | 3/2009 |

(Continued)

OTHER PUBLICATIONS

Co-pending U.S. Appl. No. 15/067,427, filed Mar. 11, 2016.

(Continued)

*Primary Examiner* — David J Hlavka
(74) *Attorney, Agent, or Firm* — Marshall & Melhorn, LLC

(57) ABSTRACT

A system for monitoring torque input into a transmission from a torque source comprising a torque sensing device and a control mechanism. The torque sensing device adapted to transfer torque from the torque source to the transmission input while measuring said torque. The control mechanism may be adapted to control the transmission in order to prevent damage from a high torque situation.

10 Claims, 6 Drawing Sheets

(56) References Cited

U.S. PATENT DOCUMENTS

| | | |
|---|---|---|
| 2,148,759 A | 2/1939 | Grand |
| 2,405,201 A | 8/1946 | Franck |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,376,633 A | 4/1968 | Wesley |
| 3,407,687 A | 10/1968 | Hayashi |
| 3,470,720 A | 10/1969 | Phillip et al. |
| 3,505,718 A | 4/1970 | Carl |
| 3,583,060 A | 6/1971 | Maurice |
| 3,688,600 A | 9/1972 | Allan |
| 3,765,270 A | 10/1973 | Lemieux |
| 3,774,280 A | 11/1973 | Eklund et al. |
| 3,831,245 A | 8/1974 | Amos |
| 3,894,559 A | 7/1975 | Depuy |
| 4,046,988 A | 9/1977 | Okuda et al. |
| 4,187,709 A | 2/1980 | Legate et al. |
| 4,226,140 A | 10/1980 | Gaasenbeek |
| 4,333,358 A | 6/1982 | Grattapaglia |
| 4,344,336 A | 8/1982 | Carriere |
| 4,360,090 A | 11/1982 | Wonn |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,168,778 A | 12/1992 | Todd et al. |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,961,415 A | 10/1999 | Justice et al. |
| 5,971,883 A | 10/1999 | Klemen |
| 5,996,226 A | 12/1999 | Gibbs |
| 6,009,365 A | 12/1999 | Takahara et al. |
| 6,036,616 A | 3/2000 | McCarrick et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,632,157 B1 | 10/2003 | Gierling et al. |
| 6,641,497 B2 | 11/2003 | Deschamps et al. |
| 6,645,106 B2 | 11/2003 | Goo et al. |
| 6,689,012 B2 | 2/2004 | Miller et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 6,986,725 B2 | 1/2006 | Morscheck |
| 7,033,298 B2 | 4/2006 | Usoro et al. |
| 7,074,154 B2 | 7/2006 | Miller |
| 7,086,981 B2 | 8/2006 | Ali et al. |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter, Jr. |
| 7,217,214 B2 | 5/2007 | Morscheck et al. |
| 7,234,543 B2 | 6/2007 | Schaaf |
| 7,288,044 B2 | 10/2007 | Gumpoltsberger |
| 7,311,634 B2 | 12/2007 | Shim et al. |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Behm |
| 7,878,935 B2 | 2/2011 | Lahr |
| 7,951,035 B2 | 5/2011 | Platt |
| 7,980,972 B1 | 7/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,376,903 B2 | 2/2013 | Pohl et al. |
| 8,382,636 B2 | 2/2013 | Shiina et al. |
| 8,447,480 B2 | 5/2013 | Usukura |
| 8,469,856 B2 | 6/2013 | Thomassy |
| 8,545,368 B1 | 10/2013 | Davis et al. |
| 8,594,867 B2 | 11/2013 | Heap et al. |
| 8,622,871 B2 | 1/2014 | Hoff |
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,052,000 B2 | 6/2015 | Cooper |
| 9,114,799 B2 | 8/2015 | Tsukamoto et al. |
| 9,133,918 B2 * | 9/2015 | Hamrin .............. F16H 61/6649 |
| 9,156,463 B2 | 10/2015 | Legner et al. |

(56) References Cited

U.S. PATENT DOCUMENTS

| | | | |
|---|---|---|---|
| 9,194,472 B2 | 11/2015 | Versteyhe et al. | |
| 9,322,461 B2 * | 4/2016 | Younggren | F16H 15/52 |
| 9,347,532 B2 | 5/2016 | Versteyhe et al. | |
| 9,353,842 B2 | 5/2016 | Versteyhe et al. | |
| 2002/0004438 A1 | 1/2002 | Toukura et al. | |
| 2002/0094911 A1 | 7/2002 | Haka | |
| 2003/0181280 A1 | 9/2003 | Elser et al. | |
| 2003/0200783 A1 | 10/2003 | Shai | |
| 2003/0213125 A1 | 11/2003 | Chiuchang | |
| 2003/0216121 A1 | 11/2003 | Yarkosky | |
| 2003/0228952 A1 | 12/2003 | Shinichiro et al. | |
| 2004/0058769 A1 | 3/2004 | Larkin | |
| 2004/0061639 A1 | 4/2004 | Voigtlaender et al. | |
| 2004/0166984 A1 | 8/2004 | Inoue | |
| 2004/0167391 A1 | 8/2004 | Solar et al. | |
| 2004/0171452 A1 | 9/2004 | Miller et al. | |
| 2005/0102082 A1 | 5/2005 | Shinichior et al. | |
| 2005/0137046 A1 | 6/2005 | Miller et al. | |
| 2005/0153810 A1 | 7/2005 | Miller et al. | |
| 2006/0094515 A1 | 5/2006 | Szuba et al. | |
| 2006/0276294 A1 | 12/2006 | Coffey et al. | |
| 2007/0032327 A1 | 2/2007 | Raghavan et al. | |
| 2007/0042856 A1 | 2/2007 | Greenwood et al. | |
| 2007/0072732 A1 | 3/2007 | Klemen | |
| 2007/0096556 A1 | 5/2007 | Kokubo et al. | |
| 2007/0275808 A1 | 11/2007 | Iwanaka et al. | |
| 2008/0039273 A1 | 2/2008 | Smithson et al. | |
| 2008/0103002 A1 | 5/2008 | Holmes | |
| 2008/0185201 A1 | 8/2008 | Bishop | |
| 2009/0017959 A1 | 1/2009 | Triller | |
| 2009/0062064 A1 | 3/2009 | Kamada et al. | |
| 2009/0132135 A1 | 5/2009 | Quinn, Jr. et al. | |
| 2009/0221391 A1 | 9/2009 | Bazyn et al. | |
| 2009/0221393 A1 | 9/2009 | Kassler | |
| 2009/0286651 A1 | 11/2009 | Tanaka et al. | |
| 2009/0312137 A1 | 12/2009 | Rohs et al. | |
| 2010/0056322 A1 | 3/2010 | Thomassy | |
| 2010/0093479 A1 | 4/2010 | Carter et al. | |
| 2010/0106386 A1 | 4/2010 | Krasznai et al. | |
| 2010/0113211 A1 | 5/2010 | Schneider et al. | |
| 2010/0137094 A1 | 6/2010 | Pohl | |
| 2010/0141193 A1 | 6/2010 | Rotondo et al. | |
| 2010/0244755 A1 | 9/2010 | Kinugasa et al. | |
| 2010/0267510 A1 | 10/2010 | Nichols et al. | |
| 2010/0282020 A1 | 11/2010 | Greenwood et al. | |
| 2010/0304915 A1 | 12/2010 | Lahr | |
| 2010/0310815 A1 | 12/2010 | Mendonca et al. | |
| 2011/0015021 A1 | 1/2011 | Maguire et al. | |
| 2011/0034284 A1 | 2/2011 | Pohl et al. | |
| 2011/0152031 A1 | 6/2011 | Schoolcraft | |
| 2011/0165982 A1 | 7/2011 | Hoffman et al. | |
| 2011/0165985 A1 | 7/2011 | Hoffman et al. | |
| 2011/0165986 A1 | 7/2011 | Hoffman et al. | |
| 2011/0230297 A1 | 9/2011 | Shiina et al. | |
| 2011/0300954 A1 | 12/2011 | Szuba et al. | |
| 2011/0319222 A1 | 12/2011 | Ogawa et al. | |
| 2012/0024991 A1 | 2/2012 | Pilch et al. | |
| 2012/0035016 A1 | 2/2012 | Miller et al. | |
| 2012/0040794 A1 | 2/2012 | Schoolcraft | |
| 2012/0122624 A1 | 5/2012 | Hawkins, Jr. et al. | |
| 2012/0142477 A1 | 6/2012 | Winter | |
| 2012/0165154 A1 | 6/2012 | Wittkopp et al. | |
| 2012/0244990 A1 | 9/2012 | Ogawa et al. | |
| 2012/0309579 A1 | 12/2012 | Miller et al. | |
| 2013/0130859 A1 | 5/2013 | Lundberg et al. | |
| 2013/0133965 A1 | 5/2013 | Books | |
| 2013/0184115 A1 | 7/2013 | Urabe et al. | |
| 2013/0190131 A1 | 7/2013 | Versteyhe et al. | |
| 2013/0226416 A1 | 8/2013 | Seipold et al. | |
| 2013/0303325 A1 | 11/2013 | Carey et al. | |
| 2013/0304344 A1 | 11/2013 | Abe | |
| 2013/0338888 A1 | 12/2013 | Long et al. | |
| 2014/0223901 A1 | 8/2014 | Versteyhe et al. | |
| 2014/0274540 A1 | 9/2014 | Schoolcraft | |
| 2014/0274552 A1 | 9/2014 | Frink et al. | |
| 2014/0329637 A1 | 11/2014 | Thomassy et al. | |
| 2015/0024899 A1 | 1/2015 | Phillips | |
| 2015/0051801 A1 | 2/2015 | Quinn, Jr. et al. | |
| 2015/0142281 A1 | 5/2015 | Versteyhe et al. | |
| 2015/0159741 A1 | 6/2015 | Versteyhe et al. | |
| 2015/0204429 A1 | 7/2015 | Versteyhe et al. | |
| 2015/0226294 A1 | 8/2015 | Ziech et al. | |
| 2015/0226298 A1 | 8/2015 | Versteyhe et al. | |
| 2015/0226299 A1 | 8/2015 | Cooper et al. | |
| 2015/0252881 A1 | 9/2015 | Versteyhe | |
| 2015/0354676 A1 | 12/2015 | Versteyhe et al. | |
| 2016/0033021 A1 | 2/2016 | Cooper et al. | |
| 2016/0047448 A1 | 2/2016 | Versteyhe et al. | |
| 2016/0069442 A1 | 3/2016 | Versteyhe et al. | |
| 2016/0109001 A1 | 4/2016 | Schoolcraft | |
| 2016/0123438 A1 | 5/2016 | Ziech et al. | |
| 2016/0131235 A1 | 5/2016 | Phillips | |
| 2016/0185353 A1 | 6/2016 | Honma et al. | |
| 2016/0281828 A1 | 9/2016 | Haka | |
| 2016/0290458 A1 | 10/2016 | Taskiran et al. | |

FOREIGN PATENT DOCUMENTS

| | | | |
|---|---|---|---|
| CN | 101617146 A | 12/2009 | |
| CN | 202165536 U | 3/2012 | |
| DE | 1237380 B | 3/1967 | |
| DE | 3245045 A1 | 6/1984 | |
| DE | 102005010751 A1 | 9/2006 | |
| EP | 0156936 A1 | 10/1985 | |
| EP | 0210053 A2 | 1/1987 | |
| EP | 1061288 A2 | 12/2000 | |
| EP | 2113056 B1 | 7/2012 | |
| FR | 796188 A | 3/1936 | |
| FR | 1030702 A | 6/1953 | |
| FR | 1472282 A | 3/1967 | |
| FR | 2185076 A5 | 12/1973 | |
| FR | 2280451 A1 | 2/1976 | |
| FR | 2918433 A1 | 1/2009 | |
| GB | 1127825 A | 9/1968 | |
| GB | 2196892 A | 5/1988 | |
| GB | 2248895 A | 4/1992 | |
| JP | H09119506 A | 5/1997 | |
| JP | 2008180214 A | 8/2008 | |
| JP | 2009058085 A | 3/2009 | |
| JP | 2011153583 A | 8/2011 | |
| WO | WO-2006002457 A1 | 1/2006 | |
| WO | WO-2006041718 A2 | 4/2006 | |
| WO | WO-2007046722 A1 | 4/2007 | |
| WO | WO-2007051827 A1 | 5/2007 | |
| WO | WO-2008103543 A1 | 8/2008 | |
| WO | WO-2011011991 A1 | 2/2011 | |
| WO | WO-2012008884 A1 | 1/2012 | |
| WO | WO-2012177187 A1 | 12/2012 | |
| WO | WO-2013109723 A1 | 7/2013 | |
| WO | WO-2013123117 A1 | 8/2013 | |
| WO | WO-2014039438 A2 | 3/2014 | |
| WO | WO-2014039439 A1 | 3/2014 | |
| WO | WO-2014039440 A1 | 3/2014 | |
| WO | WO-2014039447 A1 | 3/2014 | |
| WO | WO-2014039448 A2 | 3/2014 | |
| WO | WO-2014039708 A1 | 3/2014 | |
| WO | WO-2014039713 A1 | 3/2014 | |
| WO | WO-2014039846 A2 | 3/2014 | |
| WO | WO-2014039900 A1 | 3/2014 | |
| WO | WO-2014039901 A1 | 3/2014 | |
| WO | WO-2014078583 A1 | 5/2014 | |
| WO | WO-2014124291 A1 | 8/2014 | |
| WO | WO-2014151889 A2 | 9/2014 | |
| WO | WO-2014159755 A2 | 10/2014 | |
| WO | WO-2014159756 A2 | 10/2014 | |
| WO | WO-2014165259 A1 | 10/2014 | |
| WO | WO-2014179717 A1 | 11/2014 | |
| WO | WO-2014179719 A1 | 11/2014 | |
| WO | WO-2014186732 A1 | 11/2014 | |
| WO | WO-2014197711 A1 | 12/2014 | |
| WO | WO-2015059601 A1 | 4/2015 | |
| WO | WO-2015073883 A1 | 5/2015 | |
| WO | WO-2015073887 A1 | 5/2015 | |
| WO | WO-2015073948 A2 | 5/2015 | |

(56) References Cited

FOREIGN PATENT DOCUMENTS

| | | |
|---|---|---|
| WO | WO-2015195759 A2 | 12/2015 |
| WO | WO-2015200769 A1 | 12/2015 |
| WO | WO-2016094254 A1 | 6/2016 |

OTHER PUBLICATIONS

Co-pending U.S. Appl. No. 15/067,752, filed Mar. 11, 2016.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al. A Three Revolute Cobot Using CVTs in Parallel. Proceedings of IMECE (1999) 6 pgs.
PCT/US2013/021890 International Preliminary Report on Patentability dated Jul. 31, 2014.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Preliminary Report on Patentability dated Mar. 19, 2015.
PCT/US2013/057837 International Search Report and Written Opinion dated Mar. 31, 2014.
PCT/US2013/057838 International Preliminary Report on Patentability dated Mar. 19, 2015.
PCT/US2013/057838 International Search Report and Written Opinion dated Jan. 17, 2014.
PCT/US2013/057839 International Preliminary Report on Patentability dated Mar. 19, 2015.
PCT/US2013/057839 International Search Report and Written Opinion dated Feb. 6, 2014.
PCT/US2013/057866 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/057868 International Search Report and Written Opinion dated Apr. 9, 2014.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058615 International Search Report and Written Opinion dated Feb. 11, 2014.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Preliminary Report on Patentability dated May 28, 2015.
PCT/US2013/070177 International Search Report and Written Opinion dated Apr. 14, 2014.
PCT/US2014/015352 International Search Report and Written Opinion dated May 27, 2014.
PCT/US2014/025001 International Preliminary Report on Patentability dated Sep. 24, 2015.
PCT/US2014/025001 International Search Report and Written Opinion dated Jul. 14, 2014.
PCT/US2014/025004 International Preliminary Report on Patentability dated Oct. 1, 2015.
PCT/US2014/025004 International Search Report and Written Opinion dated Jul. 14, 2014.
PCT/US2014/025005 International Preliminary Report on Patentability dated Oct. 1, 2015.
PCT/US2014/025005 International Search Report and Written Opinion dated Jul. 14, 2014.
PCT/US2014/026619 International Preliminary Report on Patentability dated Sep. 24, 2015.
PCT/US2014/026619 International Search Report and Written Opinion dated Sep. 9, 2014.
PCT/US2014/036621 International Preliminary Report on Patentability dated Nov. 12, 2015.
PCT/US2014/036621 International Search Report and Written Opinion dated Sep. 4, 2014.
PCT/US2014/036623 International Preliminary Report on Patentability dated Nov. 12, 2015.
PCT/US2014/036623 International Search Report and Written Opinion dated Sep. 4, 2014.
PCT/US2014/038439 International Preliminary Report on Patentability dated Nov. 26, 2015.
PCT/US2014/038439 International Search Report and Written Opinion dated Sep. 30, 2014.
PCT/US2014/041124 International Preliminary Report on Patentability dated Dec. 17, 2015.
PCT/US2014/041124 International Search Report and Written Opinion dated Oct. 15, 2014.
PCT/US2014/065792 International Preliminary Report on Patentability dated Jun. 2, 2016.
PCT/US2014/065792 International Search Report and Written Opinion dated Apr. 9, 2015.
PCT/US2014/065796 International Preliminary Report on Patentability dated Nov. 6, 2015.
PCT/US2014/065796 International Search Report and Written Opinion dated Apr. 9, 2015.
PCT/US2014/065909 International Search Report and Written Opinion dated Feb. 19, 2015.
PCT/US2014/065909 Written Opinion dated Dec. 11, 2015.
PCT/US2014/065909 Written Opinion dated Jun. 6, 2016.
PCT/US2015/36170 International Search Report and Written Opinion dated Dec. 17, 2015.
PCT/US2015/37916 International Search Report and Written Opinion dated Sep. 29, 2015.
PCT/US2015/64087 International Search Report and Written Opinion dated Feb. 11, 2016.
U.S. Appl. No. 13/743,951 Office Action dated Aug. 19, 2015.
U.S. Appl. No. 13/743,951 Office Action dated Jan. 21, 2016.
U.S. Appl. No. 13/743,951 Office Action dated Mar. 18, 2015.
U.S. Appl. No. 14/017,054 Office Action dated Aug. 27, 2014.
U.S. Appl. No. 14/017,054 Office Action dated Dec. 12, 2014.
U.S. Appl. No. 14/175,584 Office Action dated Apr. 2, 2015.
U.S. Appl. No. 14/175,584 Office Action dated Dec. 3, 2015.
U.S. Appl. No. 14/210,130 Office Action dated Jun. 7, 2016.
U.S. Appl. No. 14/210,130 Office Action dated Nov. 20, 2015.
U.S. Appl. No. 14/378,750 Office Action dated Apr. 8, 2016.
U.S. Appl. No. 14/425,598 Office Action dated Jun. 14, 2016.
U.S. Appl. No. 14/425,600 Office Action dated May 16, 2016.
U.S. Appl. No. 14/425,842 Office Action dated Jul. 1, 2016.
U.S. Appl. No. 14/426,139 Office Action dated Oct. 6, 2015.
U.S. Appl. No. 14/542,336 Office Action dated Nov. 25, 2015.
U.S. Appl. No. 15/067,752 Office Action dated Jun. 30, 2016.
U.S. Appl. No. 60/616,399, filed Oct. 5, 2004.
U.S. Appl. No. 61/819,414, filed May 3, 2013.
Wong. The Temple of VTEC Asia Special Focus on the Multimatic Transmission. Temple of VTEC Asia. (5 pgs.) (2000).
Co-pending U.S. Appl. No. 15/209,487, filed Jul. 13, 2016.
Co-pending U.S. Appl. No. 15/215,179, filed Jul. 20, 2016.
PCT/US2016/027496 International Search Report and Written Opinion dated Jul. 8, 2016.

(56) References Cited

OTHER PUBLICATIONS

PCT/US2016/29853 International Search Report and Written Opinion dated Aug. 8, 2016.
U.S. Appl. No. 14/334,538 Office Action dated Jul. 29, 2016.
Co-pending U.S. Appl. No. 15/260,472, filed Sep. 9, 2016.
Co-pending U.S. Appl. No. 15/265,163, filed Sep. 14, 2016.
Co-pending U.S. Appl. No. 15/265,226, filed Sep. 14, 2016.
Co-pending U.S. Appl. No. 15/272,774, filed Sep. 22, 2016.
Co-pending U.S. Appl. No. 15/284,940, filed Oct. 4, 2016.
PCT/US2016/030930 International Search Report and Written Opinion dated Sep. 23, 2016.
PCT/US2016/038064 International Search Report and Written Opinion dated Sep. 7, 2016.
U.S. Appl. No. 14/425,600 Office Action dated Sep. 23, 2016.
U.S. Appl. No. 62/158,847, filed May 8, 2015.

\* cited by examiner

TORQUE PEAK DETECTION AND CONTROL MECHANISM FOR A CVP

CROSS-REFERENCE TO RELATED APPLICATIONS

This application is the National Stage entry of International Application No. PCT/US2014/065909, filed Nov. 17, 2014, which claims the benefit of U.S. Provisional Application No. 61/905,742, filed Nov. 18, 2013, both of which are incorporated herein by reference in their entireties.

BACKGROUND OF THE INVENTION

Automatic and manual transmissions are commonly used on automotive vehicles, such as cars, trucks and Off-Highway Vehicles. Both conventional automatic and manual transmissions are restricted to a select few gear ratios, that enable a range of vehicle speeds while keeping the vehicle's internal combustion engine (ICE) operating within its limited operable engine speed range. Within the usable range of engine speeds for an ICE, there are optimal speeds for efficiency and power generation. Due to the discreet gear ratios of conventional automatic and manual transmissions, operating ICE vehicles at these optimal engine speeds is restricted to discreet vehicle speeds. Those transmissions are becoming more and more complicated since the engine speed has to be more precisely controlled to limit the fuel consumption and the emissions of cars. This finer control of the engine speed in usual transmissions can only be done by adding more gears (and corresponding discrete gear ratios) While adding additional gears to conventional transmissions can help the user operate the vehicle at optimal rpm ranges for a greater corresponding range of vehicle speeds, doing so adds significant cost and complexity to the transmission. Continuously variable transmissions (CVT) on the other hand can steplessly operate at an infinite number of gear rations between low gear ratio and a high gear ratio. CVTs are available in many types: belts with variable pulleys, toroidal, and conical to name a few. This ability to operate at a continuous range of gear ratios allows an automotive vehicle to operate at a constant ICE engine speed over a broad range of vehicle speeds. The main advantage of a CVT is that it enables the engine to run at its most efficient rotation speed by changing steplessly the transmission ratio as a function of the vehicle speed. Moreover, the CVT can also shift to a ratio providing more power if higher acceleration is needed. A CVT can change the ratio from the minimum to the maximum ratio without any interruption of power, unlike conventional transmissions which cause an interruption of power during ratio shifts. Furthermore, such capabilities allow for the optimization of the ICE design for narrow but more efficient power bands, allowing greater useable power from smaller displacement more economical engines. A specific use of CVTs is the Infinite Variable Transmission or IVT. Whereas the CVT is limited at positive speed ratios, the IVT configuration can perform a neutral gear and even reverse ratios steplessly. A CVT can also be used as an IVT in some driveline configurations.

A typical CVT design example is the Fallbrook "NuVinci" Technology, which is a rolling traction drive system, transmitting forces between the input and output rolling surfaces through shearing a thin fluid film. NuVinci designs utilize a continuously variable planetary (CVP) variator, which steplessly operates through a range of speed ratios. The technology is called "Continuously Variable Planetary" (CVP) due to its analogous operation to a planetary gear system. The system consists of an input disc (ring) driven by the power source, an output disc (ring) driving the CVP output and a set of balls rotating on its own axle and is fitted between these two discs and a central sun.

The torque from the input power source is transferred between input ring, balls and output ring using a thin layer of traction fluid (elasto-hydrodynamic lubrication, or EHL). The discs are clamped onto the balls tightly to achieve the clamping force required to transmit the torque.

The relative speed of the output ring is controlled by tilting the angle of the ball axles relative to the transmission axis. By tilting the ball axles the CVP can operate steplessly within a range of speed ratios. Typically the speed ration range spans underdrive to overdrive ratios.

One challenge in using a CVT, such as those having a CVP, is the management of high torques supplied to the CVT. Over-torque situations wherein torque flowing through the CVT surpasses the design limit of the variator or other components of the transmission may lead to catastrophic failure, damage, or decreased operating life of the variator or other transmission components. Currently there exists no cost-effective solution that can detect high torque high and adequately control the variator in such cases. Thus, the variator will not be protected and oversizing might be needed to ensure the sufficient life of the designs. Thus there exists a need for a system that can detect high torques being supplied to the variator and that can adequately control the variator or other aspects of the vehicle driveline to prevent damage to and preserve the operating life of the transmission, especially the variator.

SUMMARY OF THE INVENTION

Aspects of the disclosure provide systems and methods for preventing over-torque in a transmission. Additionally, aspects of the disclosure provide a systems and methods for preventing over-torque in a vehicle driveline. Over-torque is typically defined as torque exceeding a threshold value. Many embodiments provide a system for preventing over-torque in a transmission comprising: a torque sensing device drivingly engaged with a torque source and adapted to transfer torque from the torque source to an input of the transmission. The torque sensing device is typically also adapted to measure the amount of torque being transferred from the torque source to the transmission. In such embodiments the system further comprises a control mechanism operably engaged to the torque sensing device and adapted to control a current state of the transmission based on, or in response to, the amount of torque measured by the torque sensing device. Typically the control mechanism controls the current state of the transmission such that the torque in the transmission does not exceed a threshold value for the transmission's current state. The control mechanism may additionally or alternatively modify the current state of the transmission to reduce stress in the transmission caused by the applied torque. The current state of the transmission may comprise the current speed ratio of the transmission.

In many exemplary embodiments the transmission comprises a continuously variable transmission (CVT). In some embodiments the continuously variable transmission comprises a continuously variable planetary (CVP) variator, and the current state of the transmission comprises a current speed ratio of the variator.

In exemplary embodiments, the torque sensing device comprises a first rotatable member, a second rotatable member, and a torsion spring disposed therebetween; the torsion spring being drivingly engaged with both rotatable members. Typically, the first rotatable member is configured to transfer torque from the torque source through the torsion spring to the second rotatable member. The second rotatable member is typically configured to transfer torque relieved through the torsion spring to the input of the transmission. In such exemplary embodiments the torsion spring produces a phase difference in the rotations of the first and the second rotatable members, the phase difference being proportional to the torque applied by the torque source to the transmission, thereby the torque sensing device provides a measurement of the torque being applied to the transmission, also referred to as "applied torque".

In such exemplary embodiments, the torque sensing device may further comprise a first planetary gear set having a first sun, a first set of planet gears supported by a first planetary carrier, and a first ring gear. The first sun may typically be the first rotatable member. The torque sensing device may further comprise a second planetary gear set having a second sun, a second set of planet gears supported by a second planetary carrier, and a second ring gear. The second ring gear may be rotatably fixed to the first ring gear or the first and the second ring gears may be one common ring gear. The second sun may typically be the second rotatable member. In such embodiments the gear ratios between the first sun, the first set of planets and the first ring gear are the same as the gear ratios between the second sun, the second set of planets and the second ring gear. The first planetary carrier may be rotatably grounded thereby creating an angular displacement in the second planetary carrier that is proportional to the applied torque, thereby providing a non-rotating measure of the applied torque.

In some embodiments, the control mechanism may be adapted to provide rotation to one or more of an input disc of the CVP variator or an output disc of the CVP variator in response to the torque sensing device measuring the applied torque. In some embodiments, the amount of rotation provided by the control mechanism is proportional to the difference between the applied torque and the threshold for the current state of the transmission.

Aspects of the invention include vehicle drivelines comprising any of the systems for preventing over-torque in a transmission described above.

Aspects of the invention include methods of providing any of the systems for preventing over-torque in a transmission described above. Such methods may comprise providing such systems for preventing over-torque in a vehicle driveline.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

A specific use of CVTs is the Infinite Variable Transmission or IVT. Where the CVT is limited to positive speed ratios, the IVT configuration can perform a neutral gear and even reverse ratios steplessly. A CVT can be used as an IVT in some driveline configurations.

Figure 1:
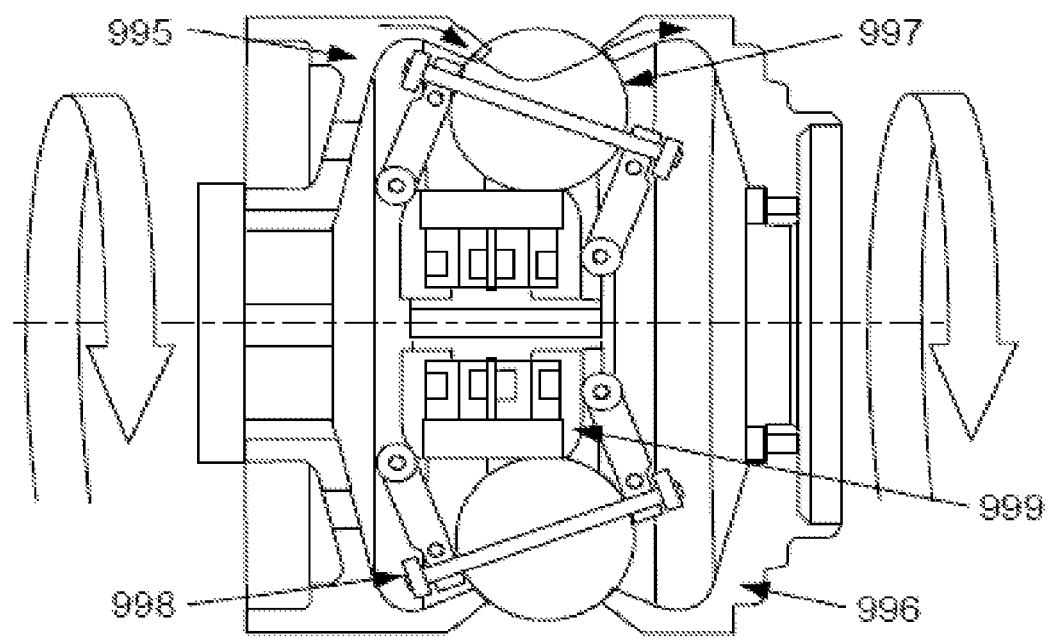
FIG. 1 is an exemplary configuration of the main elements of a CVP.
Figure 2:
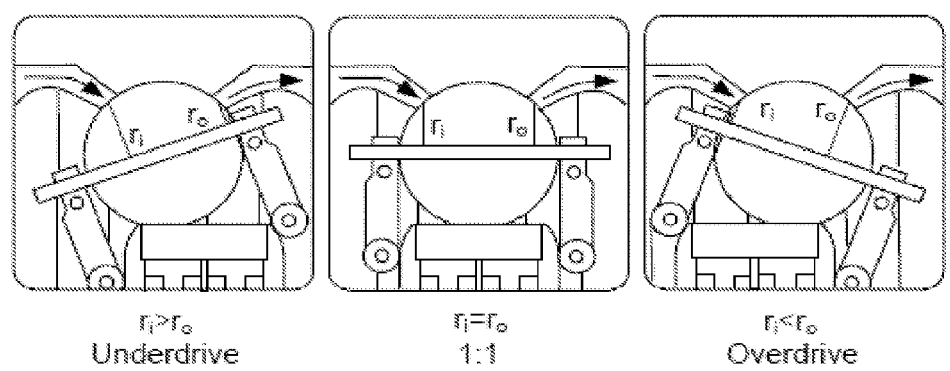
FIG. 2 illustrates the general working principle of a ball-type CVT including the ratio change in the CVP.

Provided herein are configurations based on a ball type CVT, also known as CVP, for constant variable planetary. Aspects of the CVTs are described in US2006084549 or AU2011224083A1, incorporated herein by reference in their entirety. The type of CVT used herein, as shown on FIG. 1, is composed of a plurality of variator balls, 997, depending on the application, two discs, input disc, 995, and output disc, 996 or annular rings each having an engagement portion that engages the variator balls, 997. The engagement portions may be in a conical or toroidal convex or concave surface contact with the variator balls, 997, as input and output. The CVT may include an idler, 999, contacting the balls, 997, as well as shown on FIG. 1. The variator balls, 997, are mounted on axes, 998, themselves held in a cage or carrier allowing changing the ratio by tilting the variator balls' axes, 998. Other types of ball CVTs also exist, like the one produced by Milner but are slightly different. These alternative ball CVTs are additionally contemplated herein. The working principle generally speaking, of a ball-type CVT is shown in FIG. 2.

The CVP itself works with a traction fluid. The lubricant between the ball and the conical rings acts as a solid at high pressure, transferring the power from the first ring assembly, through the variator balls, to the second ring assembly. By tilting the variator balls' axes, the ratio can be changed between input and output. When the axis of each of the variator balls is horizontal the ratio is one, when the axis is tilted the distance between the axis and the contact point change, modifying the overall ratio. All the variator balls' axles are tilted at the same time with a mechanism included in the cage.

Figure 3:
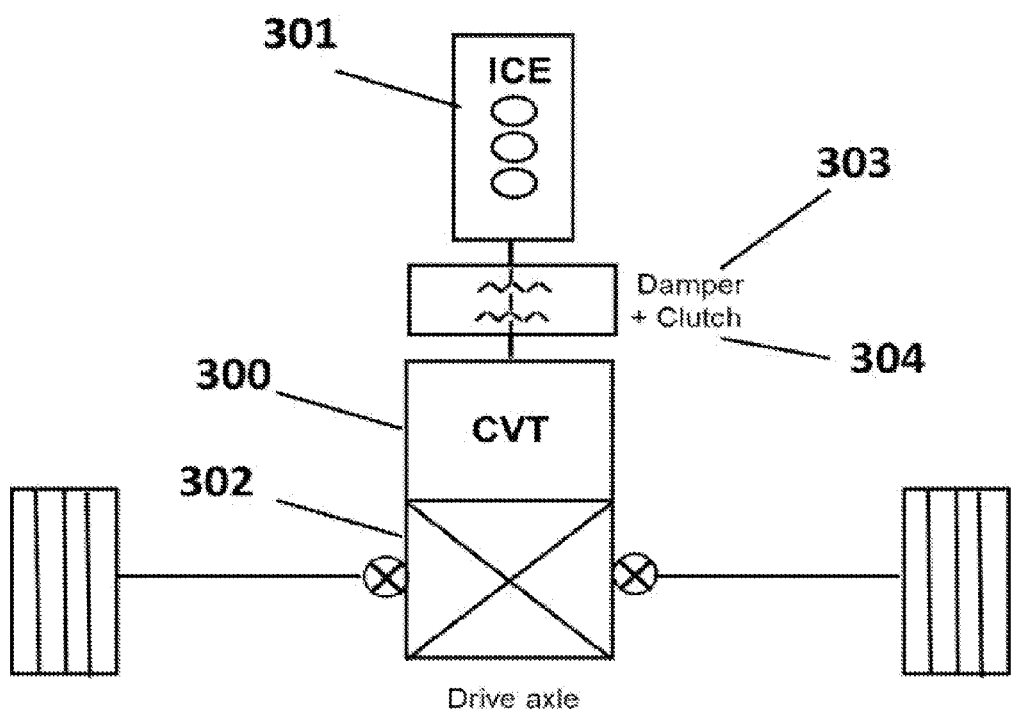
FIG. 3 illustrates how the basic driveline configuration of a CVT is used to replace a traditional transmission and is located between the engine (ICE—internal combustion engine, or other power source) and the differential.

In a car, the CVT, 300, is used to replace traditional transmission and is located between the engine (ICE, 301, or internal combustion engine) or other power source, and the differential, 302, as shown on FIG. 3. A torsional dampener, 303, alternatively called a damper, may be introduced between the engine, 301, and the CVT, 300, to avoid transferring torque peaks and vibrations that could damage the CVT, 300. In some configurations this dampener, 303, can be coupled with a clutch, 304, for the starting function or to allow the engine to be decoupled from the transmission. The CVT may also be used as the variator in this layout.

Aspects of the disclosure may also include other architectures. Various powerpath layouts can be introduced by adding a number of gears, clutches and simple or compound planetaries. The overall transmission can provide several operating modes; a CVT, an IVT, or combinations thereof.

In drivelines such as those depicted in FIG. 3, care must be taken to shield the transmission from high torque. Aspects of the disclosure include system and methods for detecting high torque peaks being transferred from a torque source to a vehicle transmission. Typically the torque source is the engine of the vehicle driveline which may be an ICE, electric motor, or other source of motive torque. Many embodiments comprise a torque sensing device located in between the engine and the transmission in the vehicle driveline. In many embodiments the torque sensing device may transfer the torque from the torque source (engine) to an input of the transmission. The input to the transmission may comprise a CVP variator. The CVP variator may require protection form torque inputs exceeding a threshold level in order to maintain viability of all components of the CVP. An exemplary embodiment is of the torque sensing device is shown in FIG. 4.

Aspects of the disclosure include a torque detection mechanism. This detection mechanism can be positioned flexibly in the CVP-layout: at the input of the variator, at the output of the variator or at some other relevant position inside a planetary configuration. More than one detection mechanism in the system may be used and the outputs may be combined. A detection mechanism may be purely mechanical. A detection mechanism may be based on electro-magnetic, hydraulic, pneumatic, or other technologies. A mechanical detection mechanism may comprise a spring inside the torque path of the CVP.

Figure 4:
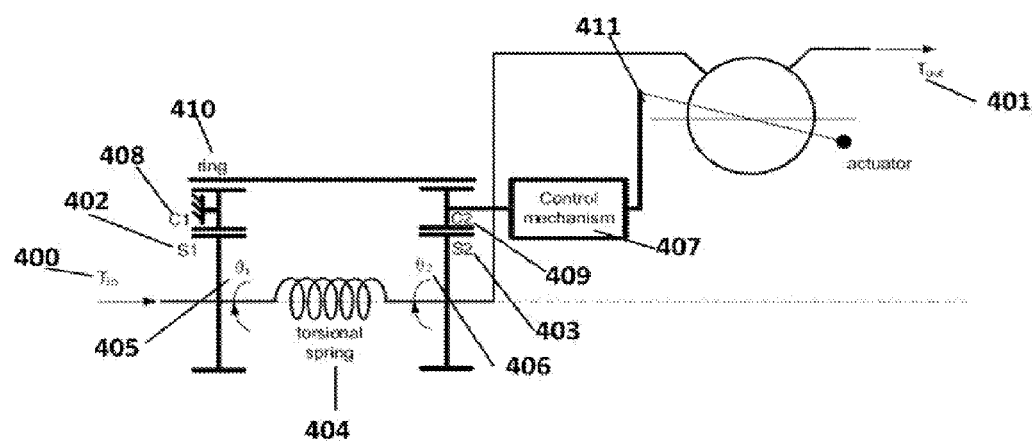
FIG. 4 is an exemplary configuration of a torque sensing device connected between a torque source and an input of a CVP variator.

Referring now to the embodiment of FIG. 4, the torque sensing device is shown connected between torque source $T_{in}$, 400, and the input of CVP variator, $T_{out}$, 401. In such embodiments, the torque sensing device may comprise two rotational members (shown as sun gears s1, 402, and s2, 403) connected via a torsion spring, 404. Torque is transferred from torque source $T_{in}$, 400, to the first rotational member s1, 402, and then the second rotational member s2, 403, through the torsion spring, 404. From s2, 403, the torque is transferred to the input of the CVP and the transmission. The torsion spring, 404, will produce a difference in the angular positions of s1, 402, an s2, 403, that is function of the torque being passed form the torque source to the transmission (also referred to as the applied torque, or $T_{in}$, 400,). Such angular displacement manifests as a phase difference between the angular (rotational) positions $\Theta_1$, 405, and $\Theta_2$, 406, of s1, 402, and s2, 403, respectively, as they rotate. The phase difference is a direct measure of the torque applied to transmission from the torque source. Angular (rotational) position sensors on s1, 402, and s2, 403 may track the phase difference thereby allowing a calculation of the applied torque from the torque source. The relationship between the applied torque and the phase difference between angular positions of s1, 402, and s2, 403 may be a linear function such as $T=k*(\Theta_1-\Theta_2)$ where T is the applied torque and k is the spring constant of the torsion spring, 404. In alternative embodiments, T may have any non-linear relationship to the phase difference $(\Theta_1-\Theta_2)$ depending on the characteristics of the spring, 404.

In exemplary embodiments the torque sensing device may convert the rotating angular difference $(\Theta_1-\Theta_2)$ created by the torsion spring, 404 into a non-rotating angular difference. The non-rotating angular difference may serve as an output of the torque sensing device and as an input to a control mechanism, 407, the control mechanism, 407, being tasked to control aspects of the vehicle driveline (including the transmission or a CVP contained therein) in order to prevent damage from too high amounts of torque. In such embodiments, the first and second rotational members may be sun gears of planetary gearsets. This is also shown in FIG. 4, as s1, 402, and s2, 403, may be each rotatably coupled to a set of planet gears supported by planet carriers c1, 408, and c2, 409, respectively. Here c1, 408, and c2, 409, are coupled to a common ring gear, 410, and c1, 408, is rotatably grounded. The gear ratios between s1, 402, c1, 408, and the ring, 410, are the same as the gear ratios between s1, 402, c2, 409, and the ring, 410. Alternatively, each of the two planetary gear sets may have their own ring gear, 410, the ring gear, 410, of the one being rotatably coupled to the other, the gear ratios of the two planetary gear sets should still be identical. Such embodiments operate as follows: When the applied torque is steady s1, 402, and s2, 403, rotate at the same speed. Since c1, 408, is stationary the ring, 410, (or separate rings) rotates at a speed determined by the gear ratio between s1, 402, and the ring, 410, through c1, 408. Since the second planetary (s1, 402, c2, 409, the ring, 410) have equivalent gear ratios to the first planetary (s1, 402, c1, 408, the ring, 410), c2, 409, will also be stationary when the applied torque is constant. When the applied torque changes, the phase difference changes between the rotational positions of s1, 402, and s2, 403, during this phase shift rotation is introduced in c2, 409, via the ring, 410, and c2, 409, will assume a new angular position. When the phase shift is completed and s1, 402, and s2, 403, are once again rotating at the same speed, c2, 409, will come to rest at a new angular position, wherein the change in c2's, 409, angular position is proportional to the change in applied torque. The angular difference between the new angular position of c2, 409, and its initial angular position serves as a direct measurement of the applied torque. Such a direct measurement is non-rotating and may be connected to drive line control devices directly in mechanically simpler ways.

In many embodiments the torque sensing device passes information of the applied torque to a control mechanism, 407. In exemplary embodiments, the torque sensing device produces a non-rotating angular difference measurement of the applied torque, as explained above. This non-rotating output may be directly connected to the control mechanism, 407. In alternative embodiments the phase difference between s1, 402, and s2, 403, may be tracked with angular position sensors to determine the applied torque, such information may then be passed to the control mechanism, 407.

In exemplary embodiments the control mechanism, 407, may be configured to control the speed ratio of the transmission or a CVP contained therein. A detection mechanism may be purely mechanical. A detection mechanism may be based on electro-magnetic, hydraulic, pneumatic, or other technologies. In exemplary embodiments the control mechanism, 407, is adapted to control the ball axis, 411, of the CVP balls shown in FIG. 4. If the torque sensing device detects an applied torque that is beyond a threshold torque, the control mechanism, 407, may change the speed ratio of the transmission to one that can safely accommodate the applied torque. In some embodiments, the transmission of the vehicle driveline may comprise a CVT having a CVP with a power splitting capabilities, wherein a portion of the applied torque may be routed through the transmission via more robust mechanical components depending on the current state speed ratio of the transmission. In such embodiments the control mechanism, 407, may change the speed ratio of the transmission to route a greater portion of the torque through the sturdier components when the torque sensing device detects an applied torque above the threshold. In some embodiments, this may lead to a deceleration of the vehicle which will decrease load on the variator.

Figure 5:
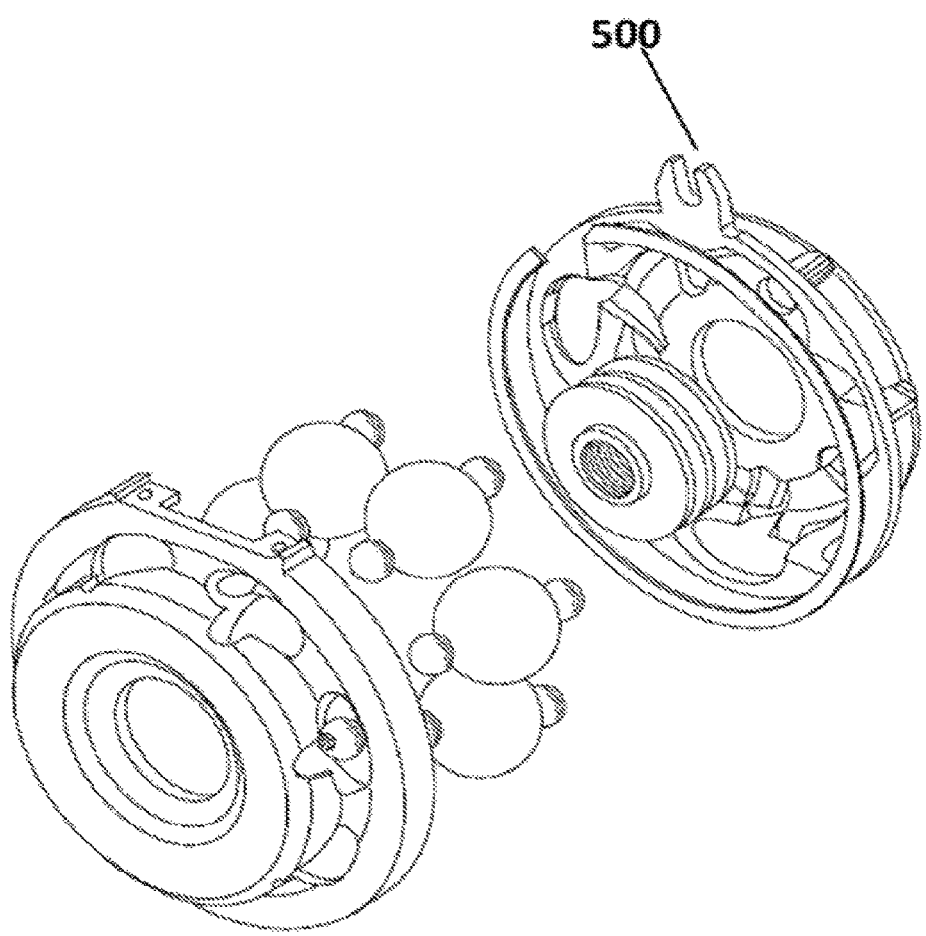
FIG. 5 illustrates a connection point within the CVP where a linkage between the control mechanism and the non-rotating angular displacement may occur.
Figure 6:
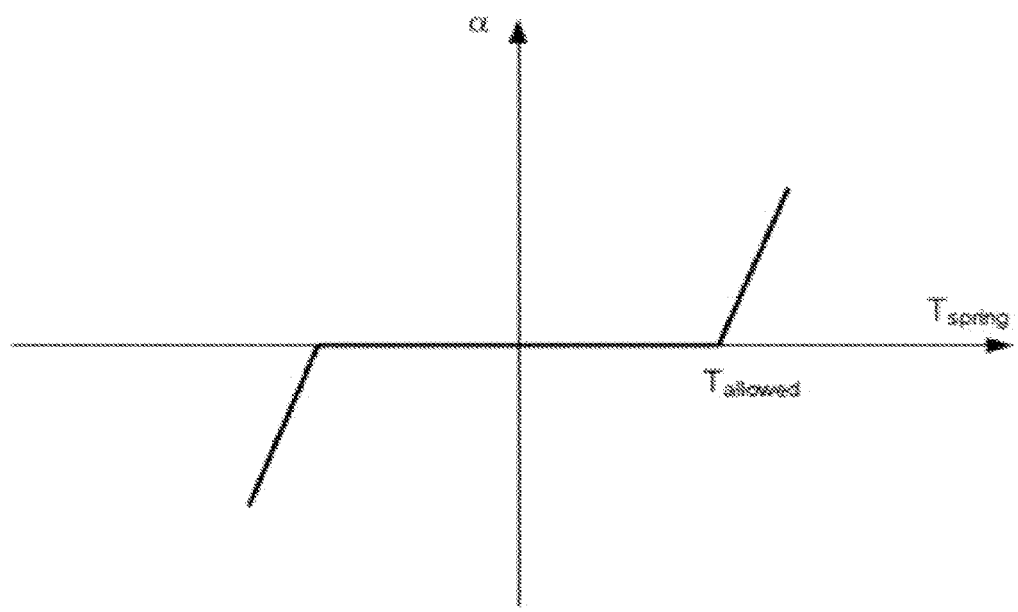
FIG. 6 illustrates the relationship between a corrective rotation, an applied torque, and a threshold.

As described above, many exemplary embodiments comprise a torque sensing device that provides a non-rotating angular displacement as a measure of the applied torque from the torque source. In many such embodiments the control mechanism, also mentioned above, may link the non-rotating angular displacement to the mechanism that controls the speed ratio of the variator (CVP) in the vehicle driveline. This link may be purely mechanical, providing an advantage of non-rotating measurement of the applied torque. The link may connect to the one of the variators input or output discs. FIG. 5 shows a connection point, 500, within the CVP where such a linkage may occur. In some embodiments, when the torque sensing device detects an applied torque above the threshold, the control mechanism may rotate one of the input or the output discs of the variator as a corrective action, also referred to as corrective rotation. In exemplary embodiments the variator will operate normally until the threshold is reached, however once the applied torque surpasses the threshold the control mechanism may supply the corrective rotation a to either the input or output disc. Such corrective rotation may alleviate stress within the CVP resulting from the over-torque situation, thereby prolonging the life of the transmission. The corrective rotation a may increase as the applied torque T increases past the threshold $T_{allowed}$. This relationship is shown in FIG. 6.

The control mechanism may be implemented purely mechanically. Alternatively, the control mechanism may involve a combination of mechanical and other technologies; e.g.: electrical, hydraulic, and magnetic. The control mechanism may have flexibility to handle both positive and negative torques.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for preventing over-torque in a transmission comprising:
   a torque sensing device drivingly engaged with a torque source and adapted to transfer torque from the torque source to an input of the transmission and adapted to measure an applied torque, being an amount of torque being transferred to the transmission from the torque source; and
   a control mechanism operably engaged to the torque sensing device and adapted to modify a current state of the transmission based on the amount of torque measured by the torque sensing device;
   wherein the transmission comprises a continuously variable transmission (CVT),
   wherein the CVT comprises a continuously variable planetary (CVP) variator and the current state of the transmission controlled by the control mechanism comprises a speed ratio of the CVP variator, and
   wherein the torque sensing device comprises a first rotatable member, a second rotatable member and a torsion spring disposed therebetween,
      wherein the first rotatable member is configured to transfer torque from the torque source through the torsion spring to the second rotatable member,
      wherein the second rotatable member is configured to transfer torque received through the torsion spring to the input of the transmission, and
      wherein the torsion spring produces a phase difference in rotations of the first and the second rotatable members, the phase difference being proportional to the torque applied by the torque source to the transmission and thereby providing a measurement of the torque being applied to the transmission.

2. The system of claim 1, wherein the torque sensing device further comprises:
   a first planetary gearset having a first sun, a first set of planet gears supported by a first planetary carrier and a first ring gear;
   a second planetary gearset having a second sun, a second set of planet gears supported by a second planetary carrier and a second ring gear, the second ring gear being rotatably fixed to the first ring gear such that the first and second ring gears rotate together at the same speed;
   wherein the gear ratios between the first sun, the first set of planets, and the first ring gear are the same as the gear ratios between the second sun, the second set of planets, and the second ring gear,
   wherein the first rotatable member is the sun of the first planetary gearset and the second rotatable member is the sun of the second planetary gearset, and
   wherein the first planetary carrier is rotatably grounded thereby creating an angular displacement in the second planetary carrier that is proportional to the amount of torque being transferred from the torque source to the transmission, thereby providing a non-rotating measure of the torque being transferred from the torque source to the transmission.

3. The system of claim 1, wherein the control mechanism is adapted to provide rotation to one or more of an input disc of the CVP variator or an output disc of the CVP variator in response to the torque sensing device measuring the applied torque.

4. A vehicle driveline comprising the system of claim 1.

5. The system of claim 2, wherein the control mechanism is adapted to provide rotation to one or more of an input disc of the CVP variator or an output disc of the CVP variator in response to the torque sensing device measuring the applied torque.

6. The system of claim 3, wherein an amount of the rotation provided by the control mechanism is proportional to the difference between the applied torque and a threshold for the current state of the transmission.

7. The system of claim 5, wherein an amount of the rotation provided by the control mechanism is proportional to the difference between the applied torque and a threshold for the current state of the transmission.

8. A system for preventing over-torque in a transmission comprising:
   a torque sensing device drivingly engaged with a torque source and adapted to transfer torque from the torque source to an input of the transmission and adapted to measure an applied torque, being an amount of torque being transferred to the transmission from the torque source; and a control mechanism operably engaged to the torque sensing device and adapted to modify a current state of the transmission based on the amount of torque measured by the torque sensing device;

wherein the transmission comprises a continuously variable transmission (CVT), and wherein the CVT comprises a continuously variable planetary (CVP) variator and the current state of the transmission controlled by the control mechanism comprises a speed ratio of the CVP variator.

wherein the control mechanism is adapted to provide rotation to one or more of an input disc of the CVP variator or an output disc of the CVP variator in response to the torque sensing device measuring the applied torque.

9. The system of claim 8, wherein an amount of the rotation provided by the control mechanism is proportional to the difference between the applied torque and a threshold for the current state of the transmission.

10. A vehicle driveline comprising the system of claim 8.

* * * * *